R. BAXTER.

Gang Plow.

No. 3,244.

Reissued Dec. 29, 1868.

Side Elevation

Front Elevation

Side Elevation

Plan of Top Plate

Position of Plate on Plow Beam

WITNESSES:

C. L. Pillsbury

Elbert Wales.

INVENTOR.

Robert Baxter.

N. PETERS, Photo-Lithographer, Washington, D. C.

UNITED STATES PATENT OFFICE.

ROBERT BAXTER, OF FRENCH CAMP, CALIFORNIA.

IMPROVEMENT IN GANG-PLOWS.

Specification forming part of Letters Patent No. 67,483, dated August 6, 1867; Reissue No. 3,244, dated December 29, 1868.

*To all whom it may concern:*

Be it known that I, ROBERT BAXTER, of French Camp, in the State of California, have invented a new and useful Improvement in Gang-Plows; and I do hereby declare that the following is a full, clear, and exact description of the same, reference being had to the accompanying drawings and letters of reference marked thereon, making a part of this specification, in which—

Figure 1:
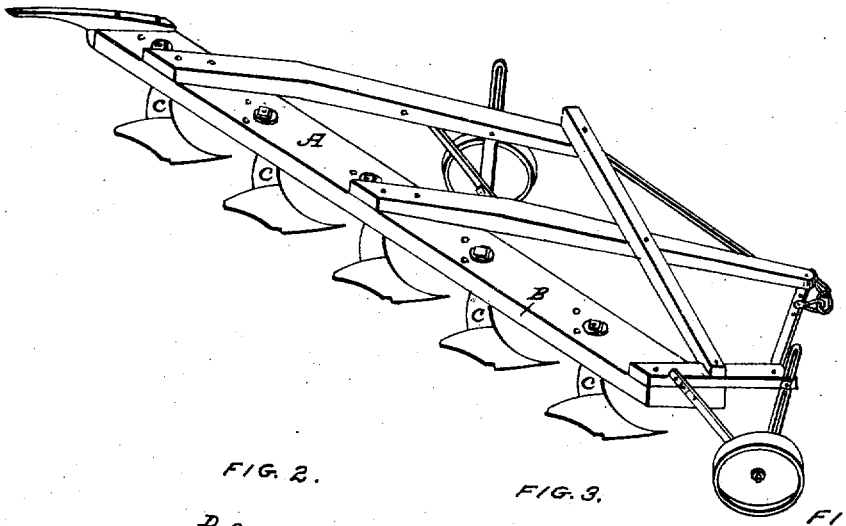
Figure 2:
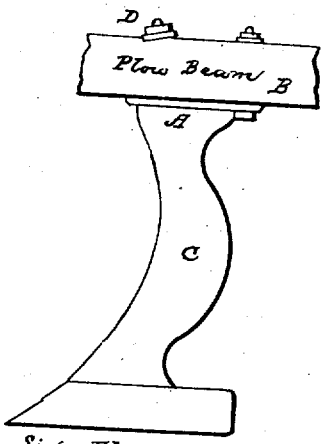
Figure 3:
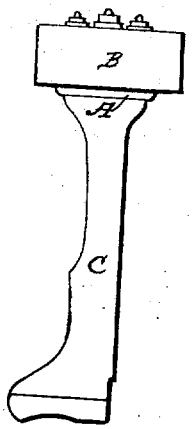
Figure 4:
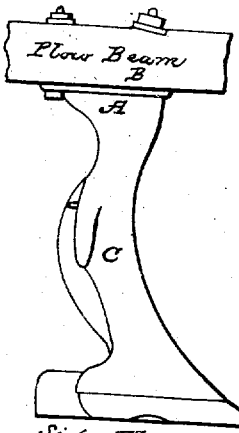
Figure 5:
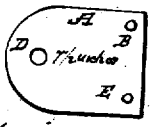
Figure 6:
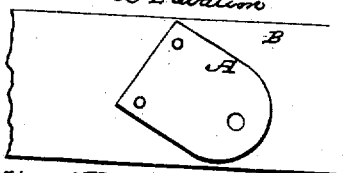

Figure 1 is a perspective view of my plow. Fig. 2 is a side elevation of my standard. Fig. 3 is a front elevation of the same. Fig. 4 is an elevation of the other side of the standard. Fig. 5 is a plan of the head of the same; and Fig. 6 is a similar view to Fig. 5, and exhibits the position of the head with reference to the beam.

To enable those skilled in the art to make and use my invention, I now proceed to describe its construction and operation.

Similar letters in the drawings refer to like parts.

This invention consists in improving the common plow-standard by forming on its upper end a flange made in one piece with it, and projecting out from it so as to increase the area of its top surface, in order that, when bolts are passed through said flange into the plow-beam, the head of the standard may be of sufficient width and length to resist all lateral strain to such a degree as to render the use of braces for the support of the standard unnecessary.

In the drawings, C represents my plow-standard provided with a head formed in one piece with it, the same consisting of a flange, A, projecting from it laterally on all sides, and extending the area of the flat top surface of the standard to six and one-half inches in width by seven in length, the flange being about three-fourths of an inch in thickness. These dimensions are indicated as convenient for common use; but I do by no means restrict myself to the shape as described.

The function of the flange A is to form a medium of attachment between the standard and beam by means of bolts, three or more in number, the main bolt passing through an eye at C, Fig. 4, a little above the middle and upon the inside of the standard, and extending upward through the flange and beam.

It is obvious that the strength of the connection is increased, as far as lateral strains are concerned, in proportion to the area of the head of the standard. I have made such head of sufficient extent to amply suffice for all ordinary purposes.

The convenience of this form of connecting device is apparent from the most casual inspection, but especially does it appear when it is compared with the system of bracing which my invention was designed to supercede and the place of which it is rapidly taking. Two or more braces are necessary to each standard not provided with my improved head, running from points near the middle thereof to the beam. These are objectionable not only on account of the expense and the trouble of putting them on, but also because they tend to collect weeds, thus clogging the plow, and are liable to catch in rocks or the like, violently arresting the progress of the team or breaking, and making it necessary to repair damages. All such inconveniences are avoided by the use of my enlarged head.

The species of plow-beam with which my improved standard may be used with special advantage is seen at B, it being a plank of, say, three inches in thickness by nine in width, in shape a parallelopiped. As I am enabled to dispense with all bracing, I need a beam of width sufficient to cover my standard-heads, but of no greater thickness than may be necessary to receive the bolts used to connect it with the standard. To these needs a plank of the above-described dimensions is entirely sufficient. Soft wood is also found to fully answer all the requirements of this beam, which is not only lighter than hard wood, but also cheaper. I have found by actual computation that the saving made by the use of my improved standard-head and this kind of beam to be at least sixteen (16) dollars in every plow of three standards.

My standards are all attached diagonally to the under side of the single plow-beam, as seen in Figs. 1 and 6, and the draft-bar H is also attached diagonally to the upper side of the beam and parallel to the lines of direction of the standards. This arrangement brings the outer end of the draft-bar nearer one extremity of the plank B than the other, which fact I take advantage of to effect what might be termed a "condensation of the plow-frame." Instead of making it lozenge-shaped, which is the form naturally suggested by the inclination of the bar H to the plank, I extend the side beam, G, from near one end of the plank, out parallel with the draft-bar, and to about the same length, and connect the outer end of the said beam with the other extremity of the plank by means of the beam I, crossing the bar H and bolted thereto. A short beam, N, extends a little distance out from the same end of the plank that the beam I is bolted to, which beam N supports one of the gage-wheels, the other being attached to the outer side of the beam G. Iron braces L M unite the ends of the beams G and N with the end of the bar H, the brace M being furnished with a double-purchase clevis for the attachment of the power. The short beam N and brace M answer the purpose in a much smaller space of a beam in place of N, similar in direction and extent to the side beam, G, and the cross-beam I stays and strengthens the whole frame.

By the employment of the flange A, instead of braces, and the plank of soft wood, instead of a hard wood beam, and the peculiar and economic construction of the frame-work, a practical gang-plow is produced of extraordinary cheapness, and one in connection with which a series of from five to seven plows may be employed, with less expenditure of draft-power than any other in use, to the best of my knowledge and belief.

Having thus described my invention, what I claim as new, and desire to secure by Letters Patent, is—

A standard for the support of the mold-board or other like part of a plow, formed in one piece, with a projecting head for the attachment of the beam, substantially as described.

ROBERT BAXTER.

Witnesses:
C. WESSLES,
S. S. FAHNESTOCK.